United States Patent [19]

Carleton et al.

[11] 3,925,284

[45] Dec. 9, 1975

[54] POLYISOCYANATE-BASED FOAM PROCESS USING AMINIMIDES AS CATALYST

[75] Inventors: Peter S. Carleton, Branford; Robert J. Lockwood, East Haven; Harold E. Reymore, Jr., Wallingford, all of Conn.

[73] Assignee: The Upjohn Company, Kalamazoo, Mich.

[22] Filed: June 24, 1974

[21] Appl. No.: 482,261

[52] U.S. Cl.................. 260/2.5 AC; 260/2.5 AW
[51] Int. Cl.² ............... C08G 18/16; C08G 18/20
[58] Field of Search..... 260/2.5 AC, 2.5 AT, 80 NC

[56] References Cited
UNITED STATES PATENTS

| | | |
|---|---|---|
| 3,625,872 | 12/1971 | Ashida .................... 260/2.5 AC |
| 3,706,800 | 12/1972 | Hartlage et al. ............. 260/561 H |
| 3,745,133 | 7/1973 | Communale et al. ......... 260/2.5 AW |

*Primary Examiner*—H. S. Cockeram
*Attorney, Agent, or Firm*—Denis A. Firth; John Kekich

[57] ABSTRACT

Aminimides (mono and bis) are employed as catalysts in the reaction between a polyol and polyisocyanate in amounts up to about 0.03 mole per equivalent of polyisocyanate. The aminimides exhibit advantages over closely related tertiary amine catalysts particularly when used to prepare polyurethane foams and mixed polyurethane-polyisocyanurate foams.

7 Claims, No Drawings

POLYISOCYANATE-BASED FOAM PROCESS USING AMINIMIDES AS CATALYST

BACKGROUND OF THE INVENTION

1. Field of the Invention

This invention relates to processes for catalyzing the reaction between isocyanates and hydroxyl containing compounds and is more particularly concerned with processes for employing aminimides as catalysts for the reaction between polyisocyanates and polyols and with the polymers so prepared.

2. Description of the Prior Art

A class of compounds known as aminimides has recently become available commercially. Illustrative of such compounds are those of the following formulae:

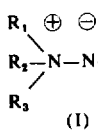 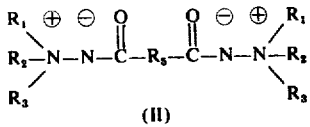

wherein $R_1$, $R_2$ and $R_4$ represent monovalent hydrocarbyl, $R_1$ and $R_2$ taken together with the N atom to which they are attached additionally represent a heterocyclic radical, $R_3$ represents monovalent hydrocarbyl, hydroxyalkyl or hydroxyalkoxyalkyl and $R_5$ represents a divalent hydrocarbon group.

The aminimides are latent sources of isocyanate and tertiary amine since they dissociate on heating in the manner shown in the following equations:

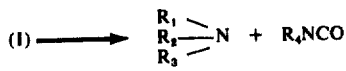

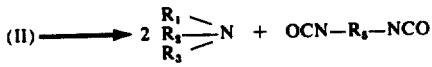

A number of uses has been described for aminimides, all of which uses are based on the heat dissociation to form isocyanates. Thus U.S. Pat. Nos. 3,706,800, 3,450,673, and 3,706,797 disclose that bisaminimides, of which the compounds of formula (II) are illustrative, can be combined with polyols to form one-package polyurethane forming compositions. The mixture of polyol and bisaminimide is stored until it is desired to prepare a polyurethane therefrom, whereupon the mixture is heated to dissociate the bisaminimide and liberate the diisocyanate. The latter than reacts with the polyol to form a polyurethane and the reaction is catalyzed by the tertiary amine which is also liberated in the dissociation.

U.S. Pat. No. 3,499,032 discloses monoaminimides which, upon heating, give rise to an isocyanate which contains active-hydrogen containing groups. These monoaminimides can therefore be used as one-component polyurethane systems which can be polymerized simply by heating. The tertiary amine which is also liberated by the dissociation serves as catalyst for the polymer formation.

It has not previously been recognized that the aminimides per se, i.e. in undissociated form, can act as catalysts for the reaction between an isocyanate group and an active-hydrogen group. Nor has it been recognized that the use of aminimides in undissociated form as catalysts for said reaction gives rise to highly advantageous results.

Accordingly it is an object of this invention to provide novel catalysts for the reaction between an isocyanate group and an active hydrogen group. It is a further object of this invention to provide polyurethanes, and like polymers which are derived by said reaction, having improved and/or modified properties.

SUMMARY OF THE INVENTION

This invention comprises an improved process for the reaction of a polyisocyanate with a polyol in the presence of a catalyst to obtain a polymer containing urethane linkages, wherein the improvement comprises employing as the catalyst an aminimide corresponding to a formula selected from:

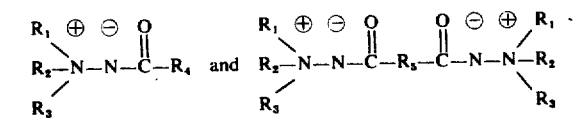

wherein $R_1$, $R_2$ and $R_4$ are monovalent hydrocarbyl from 1 to 12 carbon atoms, $R_1$ and $R_2$ taken together with the N atom to which they are attached additionally represent a heterocyclic radical, $R_3$ is selected from the class consisting of hydroxyalkyl from 2 to 12 carbon atoms, hydroxyalkoxyalkyl from 3 to 12 carbon atoms, and monovalent hydrocarbyl from 1 to 12 carbon atoms, and $R_5$ is a divalent hydrocarbyl from 1 to 12 carbon atoms.

The invention also comprises the polymers prepared using the novel catalysts of the invention. Said polymers include cellular and non-cellular polyurethanes and mixed polyurethane-polyisocyanurates which are useful for the same purposes as are the corresponding polymers prepared using catalysts hitherto employed in the art to catalyze the same reactions.

The term "monovalent hydrocarbyl from 1 to 12 carbon atoms" means the monovalent radical obtained by removing one hydrogen atom from a carbon atom of a hydrocarbon having the stated carbon atom content. Illustrative of monovalent hydrocarbyl are alkyl such as methyl, ethyl, propyl, butyl, pentyl, hexyl, octyl, decyl, dodecyl and the like; alkenyl such as allyl, butenyl, hexenyl, octenyl, dodecenyl and the like; aralkyl such as benzyl, phenethyl, phenylpropyl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl and the like; and cycloalkenyl such as cyclopentenyl, cyclohexenyl, cycloheptenyl, cyclooctenyl and the like.

Illustrative of heterocyclic radicals, which are formed by the groups $R_1$ and $R_2$ taken together with the N atom to which they are attached, are pyrrolidinyl, pyrryl, pyrrolinyl, piperidinyl, 2-methylpiperidinyl, 2,4-dimethylpiperidinyl, and the like.

The term "hydroxyalkyl from 2 to 12 carbon atoms" means an alkyl group of the stated carbon atom content (as exemplified above) which is substituted on one of the carbon atoms thereof by hydroxy. Illustrative of hydroxyalkyl are 2-hydroxyethyl, 2-hydroxypropyl, 4-hydroxybutyl, 4-hydroxypentyl, 2-hydroxyhexyl, 3-hydroxyheptyl, 5-hydroxyoctyl, 9-hydroxynonyl, 6-hydroxydecyl, 7-hydroxyundecyl, 3-hydroxydodecyl, and the like.

The term "hydroxyalkoxyalkyl from 3 to 12 carbon atoms" means the group alkyl-O-$C_nH_{2n}$- wherein $C_nH_{2n}$ represents alkylene (straight chain and branched chain) and the total carbon atom content of the alkyl and alkylene groups is within the above range, and one of said groups is substituted by hydroxy. Illustrative of hydroxyalkoxyalkyl is 2-hydroxy-2-methoxyethyl, 2-hydroxy-3-methoxypropyl, 2-hydroxy-3-butoxypropyl, 3-(2-hydroxybutoxy)propyl, 4-(2-hydroxyethoxy)pentyl, 3-(3-hydroxybutoxy)octyl, 4-hydroxy-3-butoxypentyl, 6-hydroxy-8-butoxyoctyl, and the like.

The term "divalent hydrocarbyl from 1 to 12 carbon atoms" means the divalent radical obtained by removing two hydrogen atoms from the same or different carbon atoms in a parent hydrocarbon having the stated carbon atom content. Illustrative of divalent hydrocarbyl are alkylene such as methylene, ethylene, propylene, butylene, hexylene, octylene, nonylene, decylene, dodecylene and isomeric forms thereof; cycloalkylene such as cyclopentylene, cyclohexylene, cycloheptylene, cyclooctylene, and isomeric forms thereof; arylene such as phenylene, dimethylphenylene, tolylene, naphthylene, diphenylene and the like; aralkylene such as

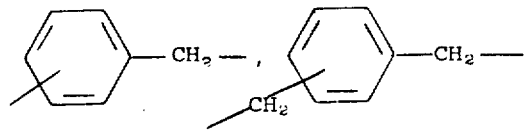

and the like; and alkenylene such as propenylene, butenylene, heptenylene, octenylene, decenylene, undecenylene, dodecenylene, and the like.

DETAILED DESCRIPTION OF THE INVENTION

The aminimides of formulae (I) and (II) are employed as catalysts for the reaction between an isocyanate and an active hydrogen containing compound using any of the procedures which are well-known in the art for such reactions. See, for example, Saunders and Frisch, Polyurethanes, Chemistry and Technology, Part II, 1964, Interscience Publishers, New York. It is merely necessary to substitute the appropriate amount of the aminimides (I) and (II) for the catalyst employed in the known processes, which processes can be for the preparation of both cellular and non-cellular polyurethanes.

In general the aminimides (I) and (II) are employed in an amount within the range of about 0.0005 moles up to about 0.03 moles per equivalent of polyisocyanate in order to achieve useful catalysis of the reaction between isocyanate and active-hydrogen compounds. Preferably the amount of aminimide (I) or (II) employed as catalyst for the reaction between isocyanate and active hydrogen containing compound is within the range of about 0.005 to about 0.015 moles per equivalent of polyisocyanate.

Since the majority of the compounds (I) and (II) are solid at ambient temperatures, it is found desirable to introduce these compounds into the polyurethane-forming reaction mixture as a solution in an appropriate solvent. Advantageously the aminimide (I) or (II) is dissolved in the polyol component of the reaction mixture and thereby introduced directly. Alternatively, the aminimide (I) or (II) is dissolved in a low molecular weight polyol, i.e., a polyol having a molecular weight less than about 600, such as ethylene glycol, diethylene glycol, triethylene glycol, dipropylene glycol, dibutylene glycol, glycerol, Cellosolve, butyl Cellosolve, Carbitol, methyl Carbitol, polyethylene glycols, ethanolamine, diethanolamine, triethanolamine, and the like. The solutions so obtained can be added directly to the polyurethane-forming reaction mixture or preblended with one of the components therefor and then added to the reaction mixture.

Any of the polyisocyanates and polyols commonly employed in the art of making polyurethanes can be employed in carrying out the polyurethane-forming reaction in conjunction with the aminimides (I) and (II). Said organic polyisocyanates include 2,4-toluene diisocyanate, 2,6-toluene diisocyanate, 4,4'-methylenebis(phenyl isocyanate), 2,4'-methylenebis(phenyl isocyanate), dianisidine diisocyanate, tolidine diisocyanate, hexamethylene diisocyanate, m-xylylene diisocyanate, 1,5-naphthalene diisocyanate, p-phenylene diisocyanate, 1,4-diethylbenzene-$\beta$, $\beta'$-diisocyanate, tri-(4-isocyanatophenyl)methane, and other di- and higher polyisocyanates such as those listed in the tables of Siefken, Annalen, 562, 122-135, 1949. Mixtures of two or more of the above isocyanates can be used, such as mixtures of the 2,4- and 2,6- isomers of toluene diisocyanate, mixtures of the 2,4'- and 4,4'-methylenebis(phenyl isocyanate) and the like.

In addition to the various isomers of methylenebis(phenyl isocyanate) and mixtures of these isomers, there can also be used modified forms of these isocyanates. For example, there can be used 4,4'-methylenebis(phenyl isocyanate), or an admixture thereof with a minor amount of the 2,4'-isomer, which has been treated to convert a minor proportion, generally less than 15 percent by weight of the starting material, to an artefact of the latter. For example, the polyisocyanate (II) can be methylenebis(phenyl isocyanate) which has been converted to a stable liquid form in accordance with the process of U.S. Pat. No. 3,384,653. Illustrative of another form of modified methylenebis(phenyl isocyanate) is the product obtained by treating 4,4'-methylenebis(phenyl isocyanate), or mixtures thereof with the 2,4'-isomer, with a minor proportion of a carbodiimide such as diphenyl carbodiimide in accordance with the process described in British Pat. No. 918,454.

In addition to the di- and higher polyisocyanates illustrated above, the organic polyisocyanates (II) employed in the preparation of the polymers of the invention include the isocyanate-terminated prepolymers obtained by reacting an excess of any of the polyisocyanates discussed above with a polyol. The polyols employed in making the isocyanate-terminated prepolymers can be any of those conventionally employed in the art for this purpose. Advantageously, said polyols have an hydroxy equivalent weight of about 30 to about 2,000 and a functionality from 2 to 4. Preferably, said polyols are diols, i.e., have a functionality of 2.

The polyols employed in making polyurethanes in accordance with the process of the invention can be polyesters or polyethers. Illustrative of the polyether polyols are polyoxyalkylene glycols such as polytetramethylene glycol, the polyoxyethylene glycols prepared by the addition of ethylene oxide to water, ethylene glycol or diethylene glycol; polyoxypropylene glycols prepared by the addition of 1,2-propylene oxide to water, propylene glycol or dipropylene glycol; mixed oxyethylene oxypropylene glycols prepared in a similar manner utilizing a mixture of ethylene oxide or propylene oxide or a sequential addition of ethylene oxide and 1,2-propylene oxide; polyether glycols prepared by reacting ethylene oxide, propylene oxide, or mixtures thereof with mono- and polynuclear dihydroxybenzene, e.g. catechol, resorcinol, hydroquinone, orcinol, 2,2-bis(p-hydroxyphenl)propane, bis(p-hydroxyphenyl)methane and the like; and polyethers prepared by reacting ethylene oxide, propylene oxide, or mixtures thereof with aliphatic polyols such as glycerol, trimethylol-propane, 1,2,6-hexanetriol, and the like.

Illustrative of polyester polyols are those prepared by polymerizing ε-caprolactone using an initiator such as ethylene glycol, ethanolamine and the like, and those prepared by esterification of polycarboxylic acids such as phthalic, terephthalic, succinic, glutaric, and adipic acids and the like, with polyhydric alcohols such as ethylene glycol, butanediol, glycerol, trimethylolpropane, 1,2,6-hexanetriol and the like.

The aminimides (I) and (II) show particular advantages when employed to catalyze the reaction between a polyisocyanate and a polyol under foam forming conditions in the formation of cellular materials. Thus it is found that the aminimides (I) and (II) can be employed as the sole catalysts in such reactions and give highly satisfactory performance. In contrast, it is frequently necessary to use a combination of catalysts hitherto known in order to get satisfactory catalysis because no single catalyst has proved to possess all the desirable characteristics. For example, certain catalyst such as tertiary amines possess very fast initiation times but lose activity prior to completion of the reaction between isocyanate and polyol. In contrast, other catalysts such as organotin compounds possess very slow initiation times although once initiation occurs the performance of the catalyst is thereafter satisfactory.

The aminimides (I) and (II) are free from the deficiencies listed above. They possess highly satisfactory initiation times and maintain their catalytic activity throughout the time necessary to complete the reaction between isocyanate and polyol. In addition the rise profile of foams catalyzed by these compounds is very smooth and close to ideal. In many instances the aminimides (I) and (II) catalysts exhibit very long intervals between initiation and final rise times which make these compounds especially useful as catalysts for pour-in-place systems. The latter systems generally need catalysts which have reaction times sufficiently long to permit the foam mix to flow into the recesses of molds, cavities, etc.

Further, possibly due to the highly favorable performance of the aminimide catalysts, it is found that rigid polyurethane foams prepared using the aminimides (I) and (II) as sole catalysts, possess improved structural stability, when exposed to high humidity and elevated temperatures, as compared with corresponding foams made using combinations of catalysts conventionally employed in the art for the preparation of such foams.

In addition to their usefulness in the preparation of polyurethanes, the aminimides (I) and (II) are also useful in the preparation of mixed polymers in which the reaction between isocyanate and active-hydrogen containing compound is one of the polymer forming reactions taking place simultaneously with other polymer forming reactions. Illustrative of such mixed polymer forming reactions are the reactions between a polyol and an excess of polyisocyanate in the presence of (i) a catalyst which trimerizes a polyisocyanate and (ii) a catalyst which facilitates the reaction between an isocyanate and an active-hydrogen containing group. This results in the formation of a copolymer containing both isocyanurate and urethane linkages. Typical of such reactions are those described in U.S. Pat. No. 3,745,133.

A variation on the same type of polymer forming reaction is that which involves the reaction between a polyol and an excess of polyisocyanate in the presence of the above two catalysts and a catalyst which facilitates the conversion of isocyanates to carbodiimides. Typical of such reactions are those described in U.S. Pat. No. 3,723,364. In this case the reaction mixture also contains a polycarboxylic dianhydride so that an additional reaction taking place is that which results in the formation of imide linkages by condensation of isocyanate and anhydride groups.

In such mixed polymer forming reactions it is found that the aminimides (I) and (II) can be employed to great advantage as the sole catalyst present in the reaction mixture to facilitate the reaction between isocyanate and an active-hydrogen containing compound. Thus it is found that the use of the aminimides (I) and (II) in combination with a trimerization catalyst gives excellent results in the formation of mixed polyurethane-polyisocyanurate foams. In such reactions the urethane catalyst (i.e., the catalyst for the reaction between the isocyanate and active-hydrogen containing compound) initiates the first reaction at ambient temperature. The exothermic nature of the urethane-forming reaction generates sufficient heat in the reaction mixture to trigger the trimerization reaction. The latter is not normally initiated, even by catalysis, at ambient temperature. However, as will be obvious to one skilled in the art, not all combinations of urethane catalysts and trimerization catalysts will give satisfactory results in the above type reaction. For example, if there is any substantial delay between the termination of foam rise initiated by the urethane-forming reaction and the beginning of a further foam rise due to the trimerization reaction, the behaviour and properties of the resulting foam will suffer. On the other hand, the initiation of the trimerization reaction at a too early stage, or the use of a very fast trimerization catalyst could have an equally unsatisfactory result.

In the ideal situation for such a mixed urethane-isocyanaurate foam forming reaction the rise profile of the foam shows a smooth, uninterrupted pattern, i.e., there is no detectable interruption between the completion of rise due to the initial urethane-forming reaction and the beginning of the foam rise due to the trimerization reaction. It is found that the combination of the aminimide urethane catalysts (I) and (II) with certain trimerization catalysts such as those set forth in the aforementioned U.S. Pat. No. 3,745,133, comes very close to the ideal situation for rise profile as discussed above.

The aminimides (I) and (II) are found to catalyze the reaction between isocyanate and active-hydrogen containing compounds at ambient temperatures of the order of about 20°C, i.e., it is unnecessary to apply any external heat to initiate the catalysis. It is therefore clear that the aminimides per se are acting as the primary catalytic agent rather than the tertiary amine which is liberated by heating the aminimide to the dissocaiation temperature. The latter temperatures are of the order of about 150°C or higher. Further, the catalytic performance of the aminimides (I) and (II) is clearly distinguished from, and superior to, that of the corresponding tertiary amines which would be generated by thermal dissociation.

Although the aminimides (I) and (II) per se are the initial catalytic agents for the reaction between isocyanate and active-hydrogen containing groups at room temperature, it will be obvious that the exothermic nature of the urethane formation will raise the temperature of the reaction mixture ultimately to the point at which a large proportion, if not all, of the aminimide is dissociated into isocyanate and tertiary amine as described above. The isocyanate generated in the dissociation will become incorporated in the polyurethane which is produced, representing an additional advantage over the catalysts hitherto employed in the art. The tertiary amine liberated by the dissociation will, if sufficiently volatile, be eliminated from the reaction mixture. In those cases where the tertiary amine contains an active hydrogen group ($R_3$ = hydroxyalkyl or hydroxyalkoxyalkyl) the amine itself will also become bound chemically into the polyurethane rather than being dispersed physically, but not chemically bound, within the polymer as is the case with a majority of the catalysts heretofore employed.

For these reasons the diaminimides (II), particularly those in which $R_3$ represents hydroxyalkyl or hydroxyalkoxyalkyl, are preferred since the dissociation of these compounds, produced by the exothermic urethane-forming reaction, gives rise to two components each of which becomes chamically incorporated into the polymer.

The aminimides of formulae (I) and (II) are more fully described, together with methods for their preparation, in U.S. Pat. Nos. 3,450,673, 3,499,032, 3,706,797 and 3,706,800. Illustrative of these compounds are trimethylamine caprylimide, trimethylamine methylmyristimide, trimethylamine stearimide, trimethylamine β-cyclohexylaminopropionimide, triethylamine β-anilinopropionimide, trimethylamine α-methoxyacetimide, trimethylamine methacylimide, trimethylamine benzimide, bis-trimethylamine malonimide, bis-trimethylamine adipimide, bis-tributylamine adipimide, bis-N-methylpyrrolidine adipimide, bis-N-methyl-2-methylpyrrolidine adipimide, bis-trimethylamine azelaminde, bis-trimethylamine sebacimide, bis-trimethylamine terephthalimide, dimethyl-(2-hydroxy-3-butoxypropyl)amine methacrylimide, dimethyl-(2-hydroxypropyl)-amine laurimide, dimethyl-(2-hydroxypropyl)amine myristimide, and the like. A preferred group of aminimides are the trialkylamine sebacimides. A particularly preferred aminimide for use as a catalyst in the above described reactions is trimethylamine sebacimide.

The following examples describe the manner and process of making and using the invention and set forth the best mode contemplated by the inventors of carrying out the invention but are not to be construed as limiting.

EXAMPLE 1

A rigid polyurethane foam was prepared using a standard rigid polyurethane foam formulation in which the combination of two tertiary amine catalysts (tertramethylguanidine and N,N,N',N'-tetramethylbutanediamine) was replaced by bis(trimethylamine)sebacimide (Aminimide 21001: Ashland Chemical Co.). The latter was found to exhibit thermal dissociation at about 150°C as measured by thermal gravimetric analysis under nitrogen.

The foam (Foam A) was prepared as follows:

A mixture was prepared by mechanical mixing of
i 100 parts by weight of a polyol blend (equivalent weight = 151) of (a) a polyol obtained by propoxylating a polymethylene polyphenyl polyamine containing approximately 50 percent by weight of methylenedianiline and (b) a polyol of equivalent weight = 89 obtained by propoxylating glycerol;
ii 2 parts by weight of organosilicone surfactant (DC-193);
iii 40 parts by weight of trichlorofluoromethane; and
iv 16 parts by weight of a 23.8 percent w/w solution of bis(trimethylamine)sebacimide in polyethylene glycol having a molecular weight of 400 (Carbowax 400).

To the above mixture was added a blend of (a) 126.2 parts by weight of a polymethylene polyphenyl polyisocyanate containing approximately 50 percent by weight of methylenebis(phenyl isocyanate) [equivalent weight = 135; acidity 0.1 percent as HCl, maximum; viscosity 250 cps. at 25°C] and (b) 5 parts by weight of trichlorofluoromethane.

The resulting mixture was subjected to high speed mechanical stirring for 10 seconds and then poured into a 1 quart plastic cup and allowed to foam freely. The foam so obtained was allowed to cure for 5 days at 25°C before being submitted to physical testing.

For comparison purposes a second foam (Foam B) was prepared using exactly the procedure described above but replacing the aminimide catalyst in its entirety by a mixture of 1.05 parts by weight of tetramethylguanidine, 0.70 parts by weight of N,N,N',N'-tetramethylbutanediamine, 0.75 g. of a polyol of equivalent weight = 89 obtained by propoxylating glycerol and 12.8 parts by weight of polyethylene glycol of molecular weight 400 (Carbowax 400). The foam rise times, foam reaction exotherm temperatures and the physical properties of the two foams are set forth in Table I below.

TABLE I

|  | Foam A | Foam B |
| --- | --- | --- |
| Foam Rise Times (min:secs): | | |
| mix | 0:10 | 0:10 |
| cream | 0:15 | 0:12 |
| initiation | 0:17 | 0:13 |
| gel | 0:40 | 0:42 |
| rise | 0:55 | 1:05 |
| tack free | 1:00 | 1:05 |
| firm | 2:30 | 2:30 |
| Foam reaction exotherm: °F | | |
| 1 min. after mix | 170 | 165 |
| 2 min. after mix | 267 | 258 |
| 3 min. after mix | 283 | 280 |
| max. | 297 | 301 |
| Physical properties: | | |
| Density, pcf: | 1.98 | 1.78 |
| Compressive strength: psi | | |
| parallel to rise | 41.3 | 34.8 |
| perpendicular to rise | 13.3 | 13.1 |
| Friability (ASTM C421-61) % | ca 1 | ca 1 |
| Oxygen index (ASTM D-2863-70) | 21.1 | 21.2 |
| TGA[1] 50% wt. loss at °C | 530 | 515 |
| % volume change | | |
| AT 158°F, 100% relative humidity | | |
| 3 days | 8.8 | 14.2 |
| 7 days | 9.9 | 15.0 |
| 14 days | 11.4 | 17.4 |
| At 200°F, ambient humidity | | |
| 3 days | 4.5 | 4.9 |
| 7 days | 5.4 | 6.2 |
| 14 days | 7.1 | 7.9 |

[1]Thermal Gravimetric Analysis

It will be seen from the above results that the catalytic behaviour of the aminimide, in terms of foam rise times and exotherms, was substantially the same as the combination of prior art catalysts used in Foam B. However, the dimensional stability properties of Foam A, as measured by the humid age tests, were significantly superior to those of Foam B, even allowing for the slightly higher density of Foam A.

EXAMPLE 2

This example illustrates the preparation of an isocyanurate-urethane foam using an aminimide catalyst in accordance with the invention.

A mixture was prepared by blending the following (all parts by weight):

27 parts of a polyester obtained by blending 2.2 parts of diethylene glycol and 24.8 parts of the product obtained by esterifying 1 mole of chlorendic anhydride with 1.1 mole of diethylene glycol and reacting the half ester with 2.5 moles of propylene oxide;

8 parts of the reaction product of 1 mole of trimethylolpropane and 3 moles of ethylene oxide;

8 parts of epoxy novolac resin (DEN-431; Dow);

1 part of organosilicone surfactant (DC-193); and 15 parts of trichlorofluoromethane.

A second mixture was prepared by blending: 134 parts of polymethylene polyphenyl polyisocyanate containing approximately 40 percent by weight of methylenebis(phenyl isocyanate) [equivalent weight = 140; viscosity 650 cps. at 25°C];

15 parts of tris(2-chloroethyl)phosphate;

1 part of organosilicone surfactant (L-5340);

15 parts of trichlorofluoromethane;

8.4 parts of a 23.8 percent w/w solution of bis(trimethylamine)sebacimide in polyethylene glycol of molecular weight 400; and 3.81 parts of a 37.5 percent w/w solution of sodium N-(2-hydroxy-5-nonylphenyl)methyl-N-methyl-glycinate in diethylene glycol.

The second mixture was added to the first mixture and the product so obtained was subjected to high speed stirring for 10 seconds before being pured into a 1 quart paper cup and allowed to foam freely. The foam so obtained (Foam C) was allowed to cure for 5 days at 25°C before being subjected to physical testing.

A second foam (Foam D) was prepared using the identical procedure and reactants save only that the aminimide catalyst was replaced in its entirety by 0.3 parts of dibutyltindilaurate.

The foam rise times, reaction exotherms and physical properties of the two foams are set forth in Table II.

TABLE II

| | Foam C | Foam D |
|---|---|---|
| Foam Rise Times (min:secs): | | |
| mix | 0:10 | 0:09 |
| cream | 0:15 | 0:09 |
| initiation | 0:16 | 0:10 |
| gel | 0:45 | 0:32 |
| rise | 1:07 | 0:50 |
| tack free | 1:45 | — |
| firm | 6:00 | 3:30 |
| Foam reaction exotherm: °F | | |
| 1 min. after mix | 188 | 205 |
| 2 min. after mix | 267 | 261 |
| 3 min. after mix | 273 | 270 |
| max. | 291 | 282 |
| Physical properties: | | |
| Density, pcf: | 2.22 | 2.23 |
| Compressive Strength: psi | | |
| parallel to rise | 40.2 | 49.6 |
| perpendicular to rise | 19.7 | 19.5 |
| Friability % | 10.0 | 5.2 |
| Oxygen index | 29.5 | 29.7 |
| TGA: 50% weight loss at °C | 530 | 535 |

The aminimide catalyst (Foam C) exhibited an excellent reaction profile (as represented by the reaction times set forth above) and showed no break indicating end of urethane reaction or beginning of isocyanurate reaction.

EXAMPLE 3

Using the identical procedure and reactant proportions set forth in Example 1, save only that the isocyanate employed in preparing the foams of Example 1 was replaced by 127 parts by weight of the isocyanate employed in Example 2, a series of four rigid polyurethane foams (Foams E, F, G, H) was prepared using as the sole catalyst one of the following aminimides:

bis(trimethylamine)sebacimide, dimethyl-(2-hydroxy-3-butoxypropyl)amine methacrylimide,
dimethyl-(2-hydroxypropyl)amine myristimide,
dimethyl-(2-hydroxypropyl)amine laurimide.

Each of the catalysts was employed as a 25 percent w/w solution in polyethylene glycol having a molecular weight of 400 and, in each case, 16 parts of the catalyst solution was substituted for the 16 parts of the solution of bis(trimethylamine)sebacimide used as catalyst in the formulation of Example 1.

For comparison purposes, a fifth foam (Foam I) was made using exactly the same procedure and formulation described for Foam B in Example 1. The foam rise times and the physical properties of the five foams are set forth in Table III below:

TABLE III

| Foams | E | F | G | H | I |
|---|---|---|---|---|---|
| Foam Rise Times (min:secs): | | | | | |
| mix | 0:10 | 0:10 | 0:10 | 0:10 | 0:07 |
| cream | 0:15 | 0:20 | 0:17 | 0:17 | 0:09 |
| initiation | 0:22 | 1:35 | 0:25 | 0:25 | 0:11 |
| gel | 1:15 | 5:10 | 1:50 | 1:55 | 0:48 |
| rise | 2:15 | 8:45 | 3:00 | 3:30 | 2:00 |
| tack free | 2:00 | — | 3:00 | 3:30 | 2:00 |
| firm | 3:00 | 11:00 | 4:30 | 4:30 | 2:00 |
| Physical properties: | | | | | |
| Density, pcf: | 1.84 | 1.83 | — | 1.77 | 1.76 |
| % volume change At 158°F, 100% relative humidity 14 days | 14.9 | 21.2 | — | 22.1 | 20.8 |

It will be seen from the above data that the aminimide catalysts used in Foams F, G and H possessed markedly longer rise, tack free, and firm times than the known catalyst of the comparison Foam I. These characteristics of the aminimide catalysts render them especially useful in pour-in-place applications.

EXAMPLE 4

The preparation of Foam E, described in Example 3, was repeated exactly save that the amount of catalyst employed was reduced to 8 parts by weight. The foam rise times (mins:secs) were as follows:

| | |
|---|---|
| mix | 0:10 |
| cream | 0:22 |
| initiation | 0:35 |
| gel | 2:30 |
| rise | 3:30 |
| tack free | 3:30 |
| firm | 4:15 |

We claim:
1. In a process for the reaction of a polyisocyanate with a polyol in the presence of a catalyst to obtain a polymer containing urethane linkages, the improvement comprising reacting said components at ambient temperature in the presence of a catalytic amount of an aminimide corresponding to a formula selected from:

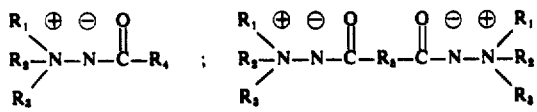

wherein $R_1$, $R_2$ and $R_4$ are monovalent hydrocarbyl from 1 to 12 carbon atoms, $R_1$ and $R_2$ taken together with the N atom to which they are attached additionally represent a heterocyclic radical, $R_3$ is selected from the class consisting of hydroxyalkyl from 2 to 12 carbon atoms, hydroxyalkoxyalkyl from 3 to 12 carbon atoms and monovalent hydrocarbyl from 1 to 12 carbon atoms, and $R_5$ is a divalent hydrocarbyl from 1 to 12 carbon atoms.

2. A process according to claim 1 wherein the aminimide is dimethyl-(2-hydroxy-3-butoxypropyl)amine methacrylimde.

3. A process according to claim 1 wherein the aminimide is bis(trimethylamine)sebacimide.

4. A process according to claim 1 wherein the aminimide is dimethyl-(2-hydroxypropyl)amine laurimide.

5. A process according to claim 1 wherein the aminimide is dimethyl-(2-hydroxypropyl)amine myristimide.

6. A process according to claim 1 wherein the reaction between the polyisocyanate and polyol is carried out under foam forming conditions to produce a polyurethane foam.

7. A process according to claim 6 wherein the aminimide catalyst is employed in combination with a trimerization catalyst whereby there is obtained a polyisocyanurate-polyurethane foam.

* * * * *